United States Patent
Kondo et al.

(10) Patent No.: US 7,031,522 B2
(45) Date of Patent: Apr. 18, 2006

(54) IMAGE PROCESSING APPARATUS AND METHOD, AND STORAGE MEDIUM THEREFOR

(75) Inventors: Tetsujiro Kondo, Tokyo (JP); Yasunobu Node, Tokyo (JP); Takayoshi Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 09/887,635

(22) Filed: Jun. 22, 2001

(65) Prior Publication Data

US 2002/0047935 A1 Apr. 25, 2002

(30) Foreign Application Priority Data

Jun. 23, 2000 (JP) .................................... 2000-188773

(51) Int. Cl.
G06K 9/66 (2006.01)
H04N 9/64 (2006.01)

(52) U.S. Cl. .................. 382/190; 382/236; 348/699
(58) Field of Classification Search ................ 382/103, 382/107, 151, 190, 236, 284, 197; 345/427; 348/699; 375/240.16
See application file for complete search history.

(56) References Cited

U.S. PATENT DOCUMENTS

| 5,274,453 A | * | 12/1993 | Maeda ........................ 348/584 |
| 5,686,956 A | * | 11/1997 | Oh et al. .................. 348/14.15 |
| 5,731,849 A | * | 3/1998 | Kondo et al. ............... 348/699 |
| 5,742,294 A | * | 4/1998 | Watanabe et al. ........... 345/672 |
| 5,880,778 A | * | 3/1999 | Akagi ..................... 348/218.1 |
| 5,907,353 A | * | 5/1999 | Okauchi .................. 348/218.1 |
| 6,049,354 A | * | 4/2000 | Sekine et al. ............. 348/208.6 |
| 6,052,414 A | * | 4/2000 | Lee et al. ............... 375/240.16 |

OTHER PUBLICATIONS

Kuwano, et al. "Telop character extraction from video data", IEEE, pp. 82–88, 1997.*

* cited by examiner

*Primary Examiner*—Daniel Mariam
(74) *Attorney, Agent, or Firm*—Frommer Lawrence & Haug LLP; William S. Frommer; Darren M. Simon (57) ABSTRACT

In an image processing apparatus, an input image is synthesized with a stored image supplied from a storage unit and having been shifted so that the positions of the pixels in the image areas of the input image and of the stored image, associated with a telop, will coincide. The level distribution of the pixel values of the input image is maintained in the telop.

15 Claims, 13 Drawing Sheets

IMAGE PROCESSING APPARATUS AND METHOD, AND STORAGE MEDIUM THEREFOR

BACKGROUND OF THE INVENTION

1. Field of the Invention

The present invention generally relates to image processing. More particularly, the present invention relates to an image processing apparatus and method, and a storage medium therefor for extracting a specific area of an image.

2. Description of the Related Art

Conventionally, methods have been proposed for extracting a specific portion of an image based on the features of the specific portion.

For example, a telop (video caption) can be extracted from an image based on its features that the luminance level thereof is higher and the edge thereof is sharper compared with the background portion.

However, there has existed the problem that the telop cannot be precisely extracted if part of the background portion is similar to the telop with respect to the luminance level and the sharpness of the edge.

SUMMARY OF THE INVENTION

The present invention has been made in view of the above, and an object thereof is to provide an image processing apparatus and method, and storage medium therefor, which allows a specific area such as a telop to be extracted more precisely.

To this end, the present invention, in one aspect thereof, provides a digital image signal processing apparatus, to which an input digital image signal is input. The digital image processing apparatus includes a storing unit for storing a digital image signal; an extracting unit for extracting a signal representing a specific area from the digital image signal stored in the storing unit; a detecting unit for detecting a motion of the specific area based on the input digital image signal and the extracted signal representing the specific area; and a synthesizing unit for synthesizing the input digital image signal and the extracted signal representing the specific area so as to align the position of the extracted specific area and the position of a corresponding area represented by the input digital image signal; wherein the storing unit updates the digital image signal stored therein with an output signal supplied from the synthesizing unit.

The synthesizing unit preferably includes a shifting unit for shifting the position of the input image or the position of the specific area according to the motion detected by the detecting unit; and an adding unit for adding the input image and the specific area.

In the signal processing apparatus, preferably, an object constituting the specific area moves differently from an object constituting the other area.

The detecting unit may detect the motion on the basis of a unit having a pitch smaller than that of the pixels of the input image, the pixel density of the synthesized image being higher than the pixel density of the input image.

Alternatively, the detecting unit may detect the motion on the basis of a unit having the same pitch as that of the pixels of the input image, the pixel density of the synthesized image being the same as the pixel density of the input image.

The synthesizing unit may include a shifting unit for shifting the position of the specific area according to the motion detected by the detecting unit; and an adding unit for adding the specific area having been shifted and the input image.

Alternatively, the synthesizing unit may include a shifting unit for shifting the position of the input image according to the motion detected by the detecting unit; and an adding unit for adding the input image having been shifted and the specific area.

The signal processing apparatus may further include a second extracting unit for extracting an area corresponding to the specific area from the input image.

The adding unit may add the input image and the specific area by a weighted addition.

The present invention, in another aspect thereof, provides a method of processing an input digital image signal. The method includes the steps of storing a digital image signal; extracting a signal representing a specific area from the digital image signal stored; detecting a motion of the specific area based on the input digital image signal and the extracted signal representing the specific area; synthesizing the input digital image signal and the extracted signal representing the specific area so as to align the position of the extracted specific area and the position of a corresponding area represented by the input digital image signal; and updating the digital image signal stored with a signal obtained in the synthesizing step.

The synthesizing step preferably includes the steps of shifting the position of the input image or the position of the specific area according to the motion detected in the detecting step; and adding the input image and the specific area.

In the method, preferably, an object constituting the specific area moves differently from an object constituting the other area.

The detecting step may detect the motion on the basis of a unit having a pitch smaller than that of the pixels of the input image, the pixel density of the synthesized image being higher than the pixel density of the input image.

Alternatively, the detecting step detects the motion on the basis of a unit having the same pitch as that of the pixels of the input image, the pixel density of the synthesized image being the same as the pixel density of the input image.

The synthesizing step may include the steps of shifting the position of the specific area according to the motion detected in the detecting step; and adding the specific area having been shifted and the input image.

Alternatively, the synthesizing step may include the steps of shifting the position of the input image according to the motion detected in the detecting step; and adding the input image having been shifted and the specific area.

The method may further include a second extracting step of extracting an area corresponding to the specific area from the input image.

The adding step may add the input image and the specific area by a weighted addition.

The present invention, in its still another aspect thereof, provides a computer-readable storage medium storing a program for processing an input digital image signal. The program includes the steps of storing a digital image signal; extracting a signal representing a specific area from the digital image signal stored; detecting a motion of the specific area based on the input digital image signal and the extracted signal representing the specific area; synthesizing the input digital image signal and the extracted signal representing the specific area so as to align the position of the extracted specific area and the position of a corresponding area represented by the input digital image signal; and updating the digital image signal stored with a signal obtained in the synthesizing step.

The synthesizing step preferably includes the steps of shifting the position of the input image or the position of the specific area according to the motion detected in the detecting step; and adding the input image and the specific area.

In the method, preferably, an object constituting the specific area moves differently from an object constituting the other area.

The detecting step may detect the motion on the basis of a unit having a pitch smaller than that of the pixels of the input image, the pixel density of the synthesized image being higher than the pixel density of the input image.

Alternatively, the detecting step detects the motion on the basis of a unit having the same pitch as that of the pixels of the input image, the pixel density of the synthesized image being the same as the pixel density of the input image.

The synthesizing step may include the steps of shifting the position of the specific area according to the motion detected in the detecting step; and adding the specific area having been shifted and the input image.

Alternatively, the synthesizing step may include the steps of shifting the position of the input image according to the motion detected in the detecting step; and adding the input image having been shifted and the specific area.

The method may further include a second extracting step of extracting an area corresponding to the specific area from the input image.

The adding step may add the input image and the specific area by a weighted addition.

In accordance with the image processing apparatus and method, and the storage medium storing the program therefor, an image is stored, a specific area having specific features is extracted from the image stored, a motion of the specific area is detected based on the specific area extracted and an input image, and the specific area and the input image are synthesized in alignment. Accordingly, the specific area can be extracted precisely.

DESCRIPTION OF THE PREFERRED EMBODIMENTS

Figure 1:
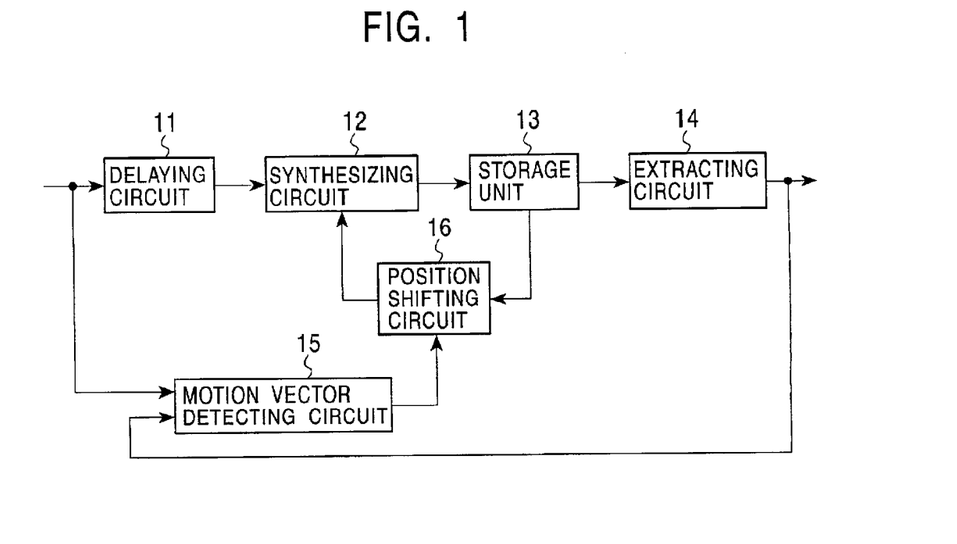
FIG. 1 is a block diagram of an image processing apparatus according to an embodiment of the present invention.

FIG. 1 is a block diagram of an image processing apparatus according to an embodiment of the present invention. The image processing apparatus allows extraction of an image area (hereinafter referred to as a specific area) such as a telop, characterized by the motion thereof being different from that of the background area.

An image which is input to the image processing apparatus is fed to a delaying circuit 11 and a motion vector detecting circuit 15. The delaying circuit 11 delays the input image for an amount of time required for the processing in a synthesizing circuit 12 through a position shifting circuit 16, to be described later, and supplies the image to the synthesizing circuit 12 with the delay, so that the synthesizing circuit 12 synthesizes the input image and an image corresponding thereto, as will be described later.

The synthesizing circuit 12 synthesizes the input image supplied from the delaying circuit 11 and an image supplied from the position shifting circuit 16, and supplies the synthesized image to a storage unit 13.

The storage unit 13 stores the image supplied from the synthesizing circuit 12, and supplies the stored image to an extracting circuit 14 and the position shifting circuit 16.

The extracting circuit 14 extracts a specific area (more precisely, an image area which has been determined as the specific area), and supplies the image data of the extracted image area and information regarding the display position thereof to the motion vector detecting circuit 15 and an external apparatus (not shown).

The motion vector detecting circuit 15 receives the input image and also receives, from the extracting circuit 14, the image data of the image area determined as the specific area of the stored image and information regarding the display position thereof. Using the image data and the display position information supplied from the extracting circuit 14, the motion vector detecting circuit 15 detects the motion vector between the specific area of the stored image (the image area determined as the specific area of the stored image) and an image area of the input image, corresponding to the specific area, and outputs the result to the position shifting circuit 16.

The position shifting circuit 16 shifts the position of the stored image supplied from the storage unit 13 based on the motion vector supplied from the motion vector detecting circuit 15, and supplies the shifted image to the synthesizing circuit 12.

Figure 2:
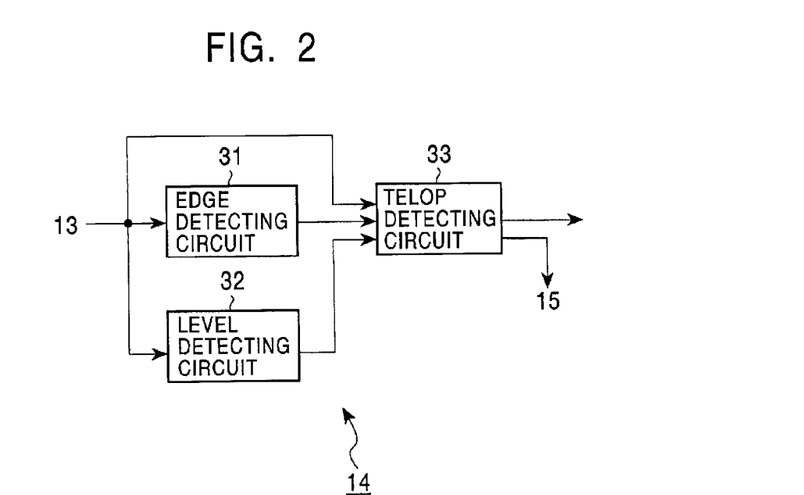
FIG. 2 is a block diagram of an extracting circuit in the image processing apparatus shown in FIG. 1.

FIG. 2 is a block diagram of an example of the extracting circuit 14, which is arranged so as to extract a telop as the specific area.

The stored image from the storage unit 13 is supplied to an edge detecting circuit 31, a level detecting circuit 32, and a telop detecting circuit 33.

The edge detecting circuit 31 detects the sharpness of the edge (edge detecting process) for each predetermined image area of the stored image, and supplies the results to the telop detecting circuit 33.

The level detecting circuit 32 detects the luminance level for each predetermined image area of the stored image (corresponding to each of the image areas for which the edge detecting process is performed in the edge detecting circuit 31), and supplies the results to the telop detecting circuit 33.

The telop detecting circuit 33 compares the sharpness of the edge detected by the edge detecting circuit 31 and the luminance level detected by the level detecting circuit 32 against predetermined threshold values for each of the image areas. If the sharpness of the edge and the luminance level of an image area are both higher than their respective threshold values, the image area of the stored image is determined as a telop. The telop can be detected in this manner because it usually has a sharp edge and a high luminance level.

The telop detecting circuit 33 obtains the image data and the display position information of the image area determined as the telop from the stored image, and outputs the image data and the display position information to the motion vector detecting circuit 15 and the external apparatus (not shown).

Although the extracting circuit 14 has been described in relation to a specific construction for extracting a telop, the extracting circuit 14 is not limited thereto, and may be implemented in different constructions which allow the extraction of a specific area.

Next, the operation of the image processing apparatus will be described with reference to the flowchart shown in FIG. 3, in relation to an example in which a telop is extracted as the specific area.

In step S1, the motion vector detecting circuit 15 detects the motion vector between an image area of the stored image, determined as a telop and extracted by the extracting circuit 14, and the corresponding image area of an input image (hereinafter referred to as field A), and supplies the result to the position shifting circuit 16.

It is to be assumed herein that the image input has already been started and an image has thus been stored in the storage unit 13. When the image data of the new input image (the field A) is input, the extracting circuit 14 obtains the image data and the display position information of the image area determined as the telop from the image stored in the storage unit 13, according to the method described earlier with reference to FIG. 2. The extracting circuit 14 then supplies the image data and the display position information to the motion vector detecting circuit 15.

Figure 3:
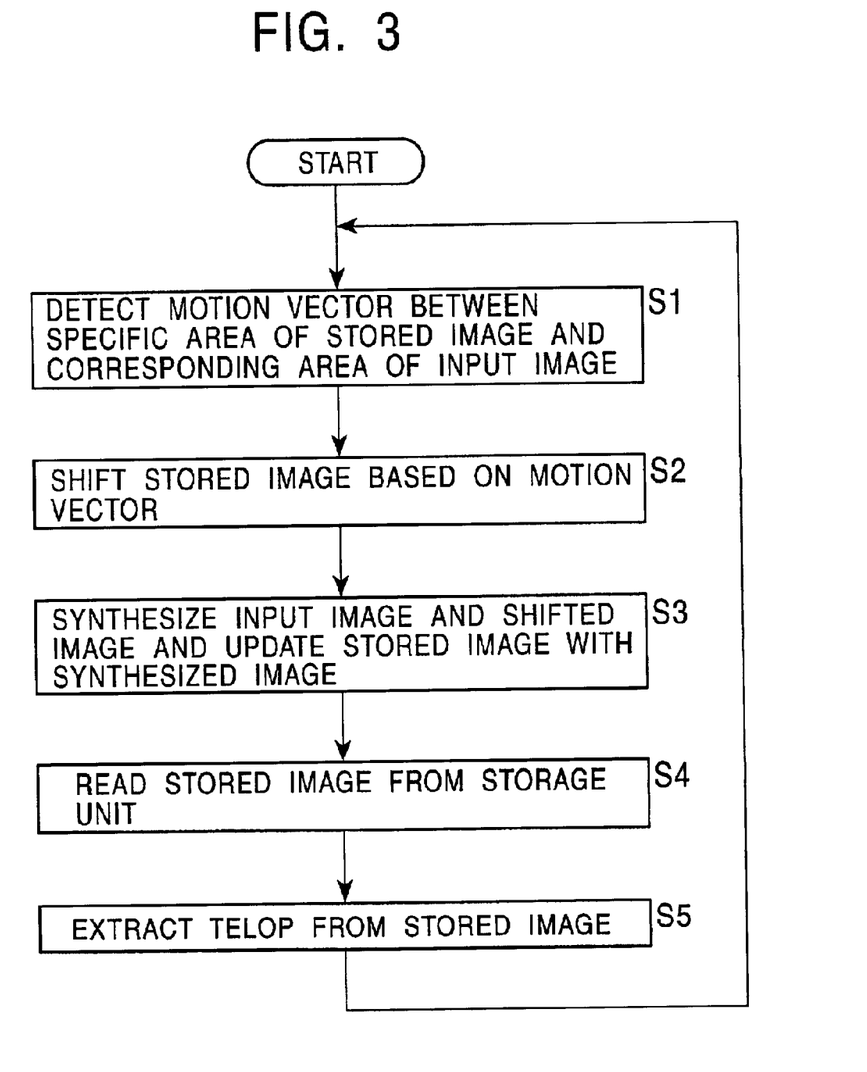
FIG. 3 is a flowchart showing the operation of the image processing apparatus shown in FIG. 1.
Figure 4:
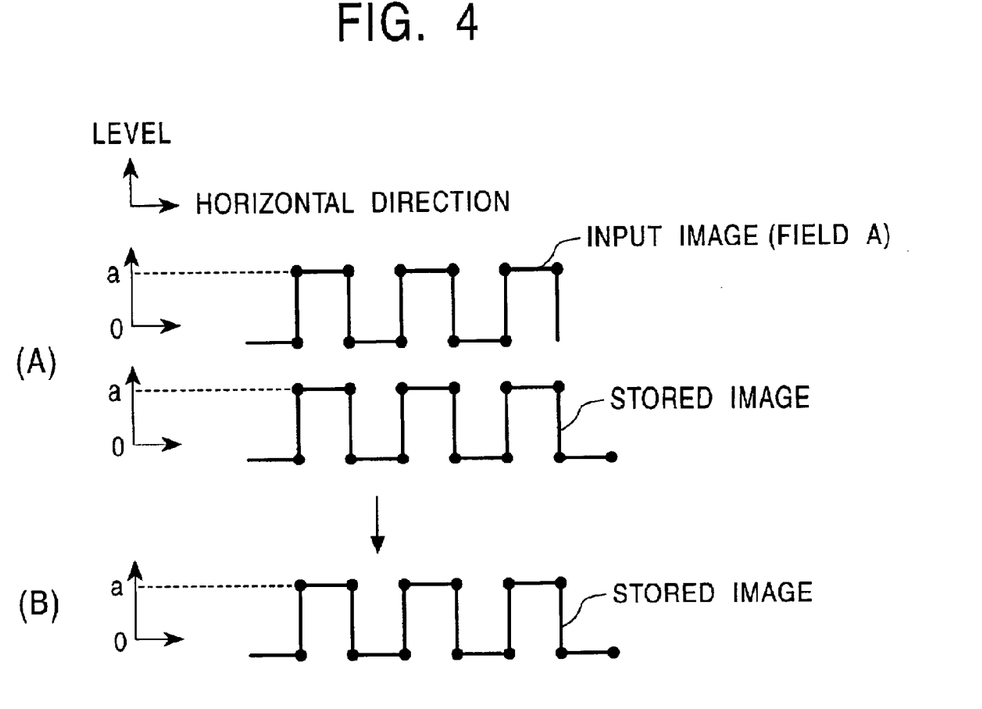
FIG. 4 is a diagram for explaining the operations of a position shifting circuit and a synthesizing circuit in the image processing apparatus shown in FIG. 1.

Next, in step S2, the position shifting circuit 16 shifts the position of the stored image before the synthesis supplied from the storage unit 13 based on the motion vector supplied from the motion vector detecting circuit 15, so that the positions of the pixels in the image area of the stored image before the synthesis, determined as the telop, and the positions of the pixels in the corresponding image area of the field A will coincide, as shown in (A) of FIG. 4.

Figure 5:
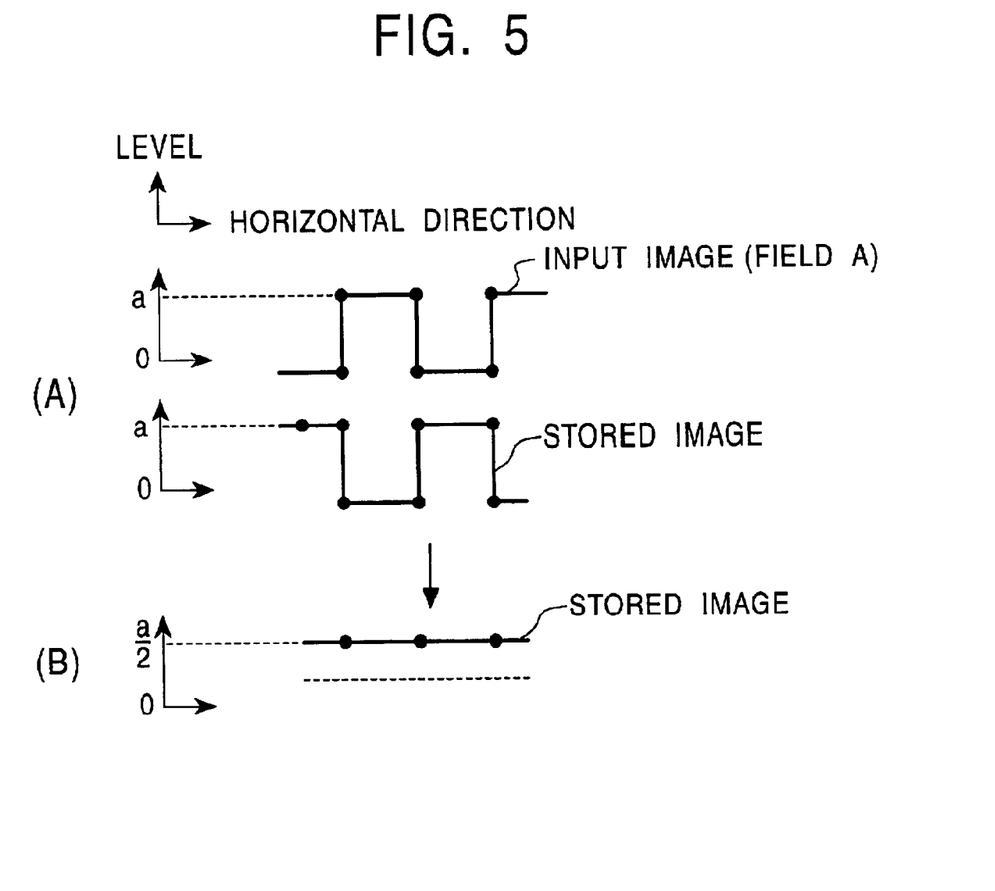
FIG. 5 is another diagram for explaining the operations of the position shifting circuit and the synthesizing circuit in the image processing apparatus shown in FIG. 1.

The positions of the pixels in the other image areas (e.g. the background) of the stored image, not associated with the telop, will not coincide with the positions of the pixels in the corresponding image area of the field A, for example, as shown in (A) of FIG. 5.

The position shifting circuit 16 supplies the shifted image to the synthesizing circuit 12.

In step S3, the synthesizing circuit 12 synthesizes the field A supplied from the delaying circuit 11 and the stored image having been shifted by the position shifting circuit 16 according to the following formula, and supplies the synthesized image to the storage unit 13.

Synthesized value=(pixel value of the input image×N+pixel value of the stored image×M)/(N+M), where N and M are predetermined coefficients.

That is, the input image and the stored image are weight-added on a pixel-by-pixel basis, the synthesized value serving as the pixel value of the image to be supplied to the storage unit 13.

In the example shown in FIGS. 4 and 5, the input image and the stored image are synthesized with the positions of the pixels in the image area of the stored image, determined as the telop (i.e., the specific area), and the positions of the pixels in the corresponding image area on the field A in alignment, as shown in (A) of FIG. 4, while the positions of the pixels in the image area of the stored image, not associated with the telop, and the positions of the pixels in the corresponding image area on the field A out of alignment, as shown in (A) of FIG. 5.

The storage unit 13 updates the stored image with the synthesized image supplied from the synthesizing circuit 12.

Then, in step S4, the extracting circuit 14 reads the updated stored image from the storage unit 13. In step S5, the extracting circuit 14 extracts an image area determined as a telop, and outputs the extracted portion to the motion vector detecting circuit 15 and the external apparatus (not shown). Then, the processing returns to step S1, and the processing steps are repeated.

As described above, the input image and the stored image are synthesized so that the positions of the pixels in the image area of the stored image, determined as the telop (i.e., the specific area), will coincide with the positions of the pixels in the corresponding image area of the field A (input image), as shown in (A) of FIG. 4. Thus, the level distribution of the telop on the stored image is maintained even after the synthesis, as shown in (B) of FIG. 4. Meanwhile, the positions of the pixels in the image areas of the input image and the stored image, not associated with the telop, do not coincide, as shown in (A) of FIG. 5. Thus, after the synthesis, the level distribution in the image area of the stored image, not associated with the telop, will be flattened, as shown in (B) of FIG. 5.

As a result, the sharpness of the edge and the luminance level of the telop become even higher compared with the other image area, allowing the extracting circuit 14 to extract the telop more precisely.

Figure 6:
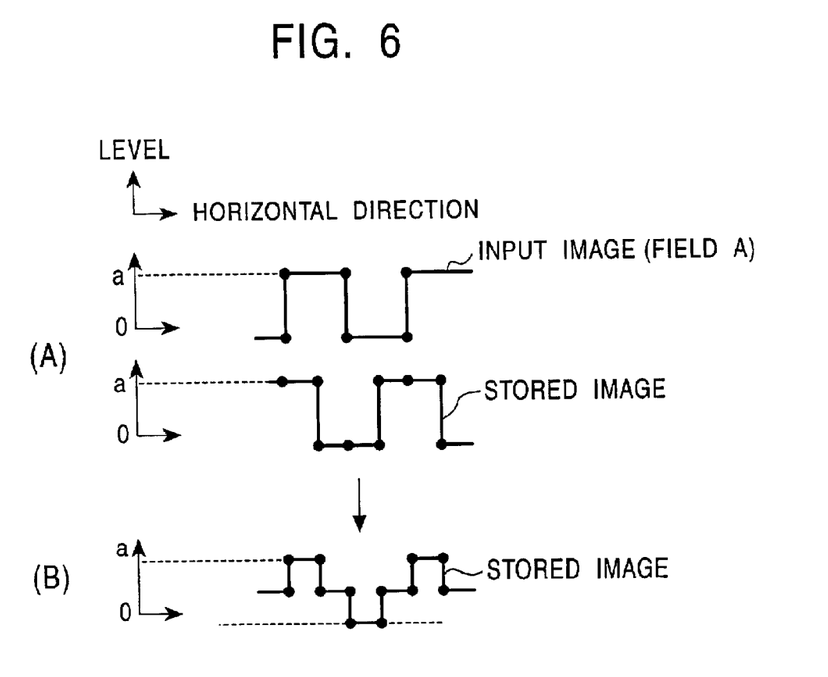
FIG. 6 is yet another diagram for explaining the operations of the position shifting circuit and the synthesizing circuit in the image processing apparatus shown in FIG. 1.

The description has been made hereinabove in relation to an example in which the input image and the stored image are synthesized so that the positions of the pixels of the input image and of the stored image, associated with the telop, will coincide. Alternatively, the input image and the stored image may be synthesized so that the positions of the pixels of the input image and the stored image have a predetermined difference, as shown in (A) of FIG. 6. In this case, the density of the pixels in the telop is increased, as shown in (B) of FIG. 6. Meanwhile, the pixel values in the image area not associated with the telop are flattened similarly as in the example described earlier, allowing a precise extraction of the telop.

In this example, the density of the pixels of the specific area is increased, and is thus different from the density of the pixels in the input image. For this reason, the motion vector detecting circuit 15 detects the motion vector by the method described below.

Figure 7:
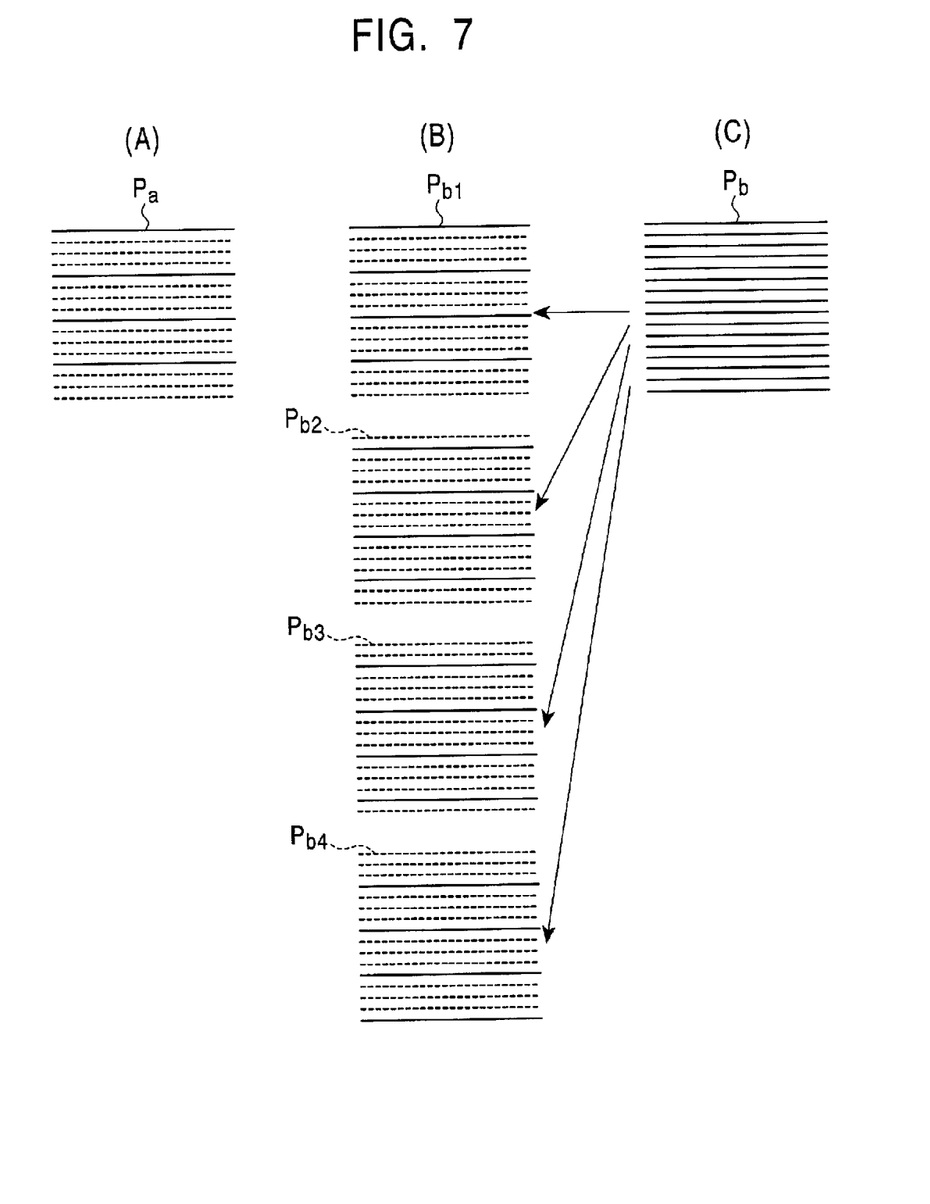
FIG. 7 is a diagram for explaining the operation of a motion vector detecting circuit in the image processing apparatus shown in FIG. 1.

The description will be made in relation to an example in which the motion vector is detected between an image Pa (corresponding to the input image) shown in (A) of FIG. 7 and an image Pb (corresponding to the specific area) having a density higher (four times higher in the vertical direction) than that of the image Pa. In FIG. 7, solid lines are what is referred to as lines, on which pixels (not shown) are disposed, whereas pixels are not provided on dotted lines equally dividing each of the spaces between the solid lines into four.

First, the high-density image Pb ((C) of FIG. 7) is divided into four images; namely, an image Pb1 in which the positions of the lines coincide relative to the image Pa, an image Pb2 in which the positions of the lines are shifted downward by one line relative to the image Pb1, an image Pb3 in which the positions of the lines are shifted downward by one line relative to the image Pb2, and an image Pb4 in which the positions of the lines are shifted downward by one line relative to the image Pb3, as shown in (B) of FIG. 7.

Figure 8A:
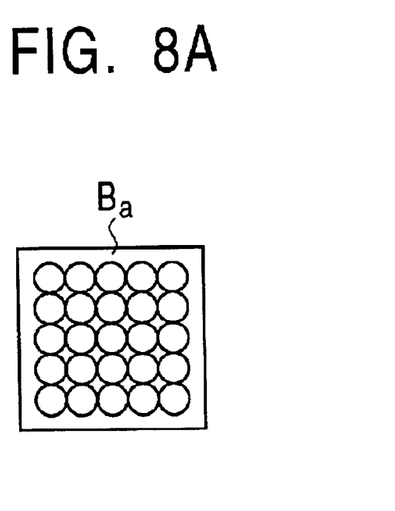
FIGS. 8A and 8B are diagrams illustrating a basic block and a reference block, respectively.
Figure 8B:
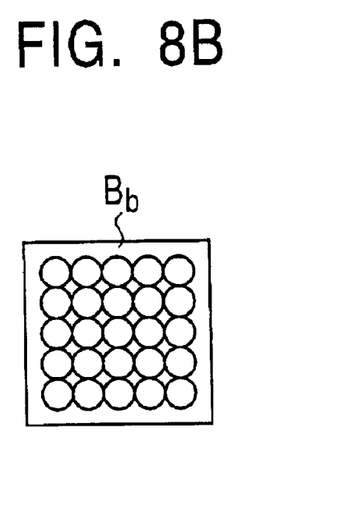
Figure 9:
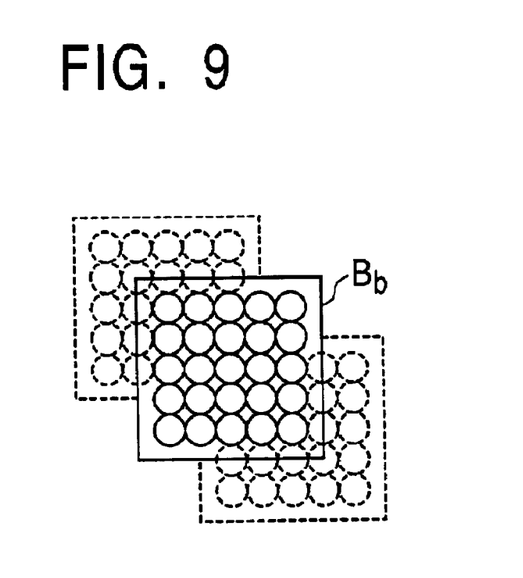
FIG. 9 is a diagram showing the movement of the reference block shown in FIG. 8B.

Next, a basic block Ba (5×5), shown in FIG. 8A, is set at a predetermined position of the image Pa (e.g., the position corresponding to the display position of the specific area). Also, a reference block Bb, shown in FIG. 8B, having the same size and shape as the basic block Ba, is set on one of the images Pb1 to Pb4, for example, the image Pb1, at a position (hereinafter referred to as the basic position) corresponding to the position of the basic block Ba set on the image Pa.

Then, the differences (absolute values) between the pixel values of the image Pa within the basic block Ba and the pixels values of the image Pb1 within the reference block Bb set at the basic position are calculated, and the sum of the absolute values (total value) is calculated. The reference block Bb is moved horizontally and vertically pixel by pixel on the image Pb1 with the standard position as the center, and at each of the positions, the sum of the differences between the pixel values of the image Pb1 within the reference block Bb and the pixel values of the image Pa within the reference block Pa is calculated. Then, a table, in which the sums of the absolute values are stored at the positions respectively corresponding to the positions of the reference block Bb, is generated.

Figure 10A:
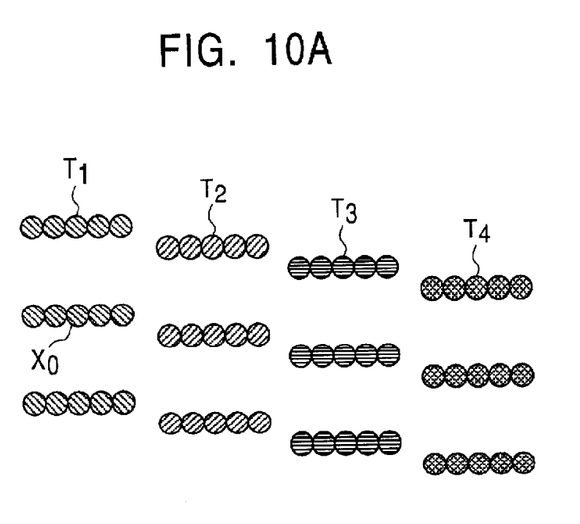
FIGS. 10A and 10B are diagrams showing examples of tables used for detecting a motion vector.

For example, if the reference block Bb is moved for two pixels rightward and leftward and for one pixel upward and downward relative to the basic position, 5×3 sums of the absolute values are calculated, a table T1 shown in FIG. 10A thus being generated. For example, the sum X0 of the absolute values in the table T1 is calculated when the reference block Bb is set at the basic position (corresponding to the basic block Ba). That is, the sum X0 of the absolute value is stored at the position corresponding to the center pixel of the basic block Ba.

As described above, the reference block Bb is set on the image Pb1 and the table T1 is generated, and then the reference block Bb is set on each of the images Pb2 to Pb4 and the corresponding tables T2 to T4 are generated in a similar manner.

The table T2 stores the sums of the absolute values calculated when the reference block Bb is set on the image Pb2, corresponding to the positions one line lower relative to the positions of the sums of the absolute values stored in the table T1.

The table T3 stores the sums of the absolute values calculated when the reference block Bb is set on the image Pb3, corresponding to the positions one line lower relative to the positions of the sums of the absolute values stored in the table T2. The table T4 stores the sums of the absolute values calculated when the reference block Bb is set on the image Pb4, corresponding to the positions one line lower relative to the positions of the sums of the absolute values stored in the table T3.

Figure 10B:
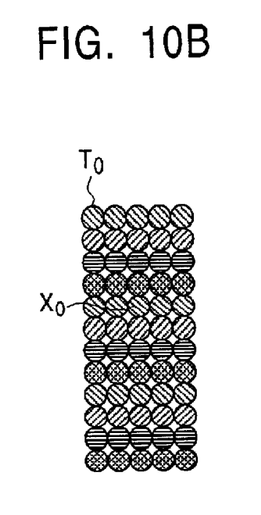

Then, the tables T1 to T4 thus generated are combined to generate a table T0 shown in FIG. 10B. That is, the table T0 stores 5×3×4 sums of the absolute values.

Then, the minimum value among the sums of the absolute values constituting the table T0 is detected, and the reference block Bb associated with the minimum value is detected. Then, the vector between the center pixel of the basic block Ba (i.e., the center pixel of the image Pa) and the center pixel of the reference block Bb (i.e., the center pixel of one of the images Pb1 to Pb4) is detected as the motion vector.

Even if the densities of pixels in the images differ, the motion vector can be detected in the above-described manner. The method is disclosed in Japanese Unexamined Patent Application Publication No. 2000-236554A.

Figure 11:
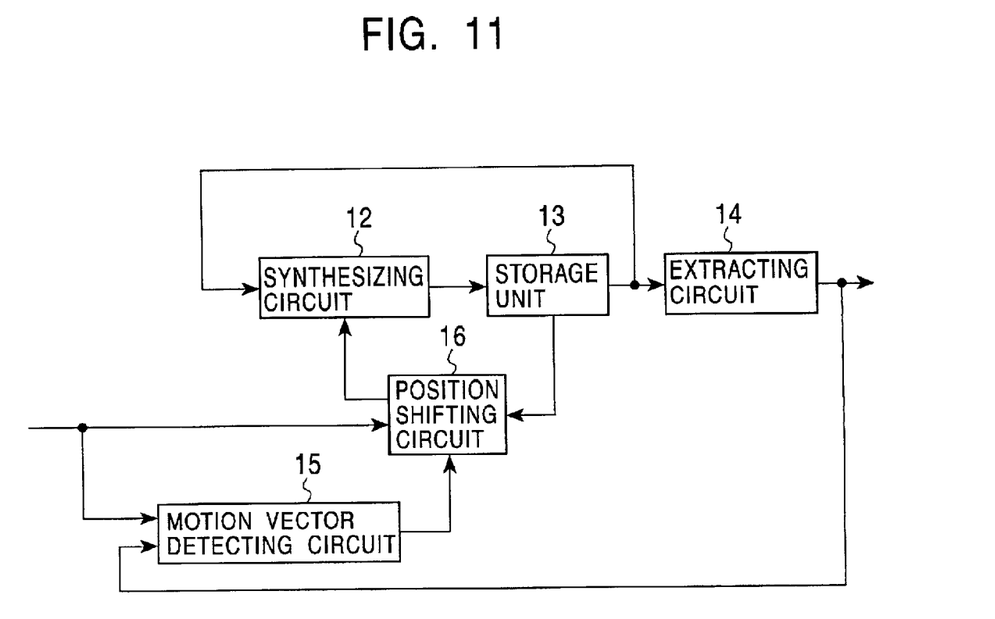
FIG. 11 is a block diagram of an image processing apparatus according to another embodiment of the present invention.

In the image processing apparatus shown in FIG. 1, the position of the stored image is shifted; alternatively, the arrangement may be such that the position of the input image is shifted. FIG. 11 is a block diagram of an image processing apparatus according to another embodiment of the present invention, in which the position of the input image is shifted.

In the image processing apparatus shown in FIG. 11, the input image is supplied to the motion vector detecting circuit 15 and also to the position shifting circuit 16. The storage unit 13 supplies the stored image to the synthesizing circuit 12.

Figure 12:
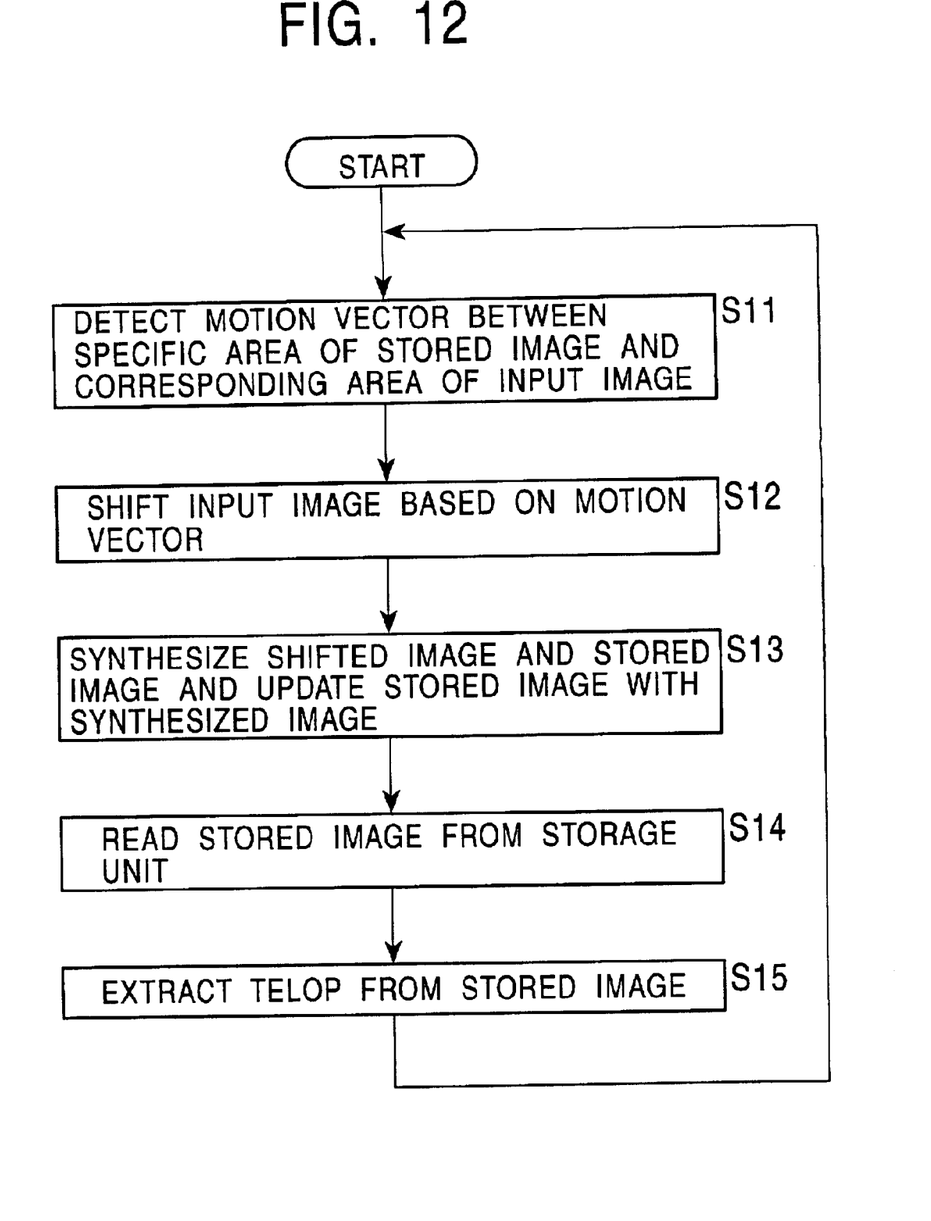
FIG. 12 is a flowchart showing the operation of the image processing apparatus shown in FIG. 11.

The operation of the image processing apparatus shown in FIG. 11 will be described with reference to the flowchart shown in FIG. 12. Again, the description will be made in relation to an example in which a telop is extracted as a specific area.

In step S11, the motion vector detecting circuit 15 detects the motion vector between the image area of the stored image, determined as the telop and extracted by the extracting circuit 14, and the corresponding image area of the input image, and supplies the result to the position shifting circuit 16.

In step S12, the position shifting circuit 12 shifts the position of the input image based on the motion vector supplied from the motion vector detecting circuit 15 so that the positions of the pixels in the image area of the stored image, determined as the telop, and the positions of the pixels in the corresponding image area of the input image will be in alignment, as shown in (A) of FIG. 4, while the positions of the pixels in the image area (e.g., the background area) of the stored image, not determined as the telop, and the positions of the pixels in the corresponding image area of the input image will be out of alignment, as shown in (A) of FIG. 5.

In step S13, the synthesizing circuit 12 synthesizes the input image having been shifted by the position shifting circuit 16 and the stored image supplied from the storage unit 13, and supplies the synthesized image to the storage unit 13. The storage unit 13 updates the stored image with the synthesized image supplied from the synthesizing circuit 12.

In steps S14 and S15, the same processes as in steps S4 and S5 shown in FIG. 3 are executed, and the descriptions thereof will be omitted.

In this embodiment as well, the stored image is supplied to the extracting circuit 14 with the level distribution of the pixel values in the specific area maintained or the density of the pixels increased, and with the pixels values of the background area, etc. flattened. Thus, the extracting circuit 14 is allowed to extract the specific area precisely.

Figure 13:
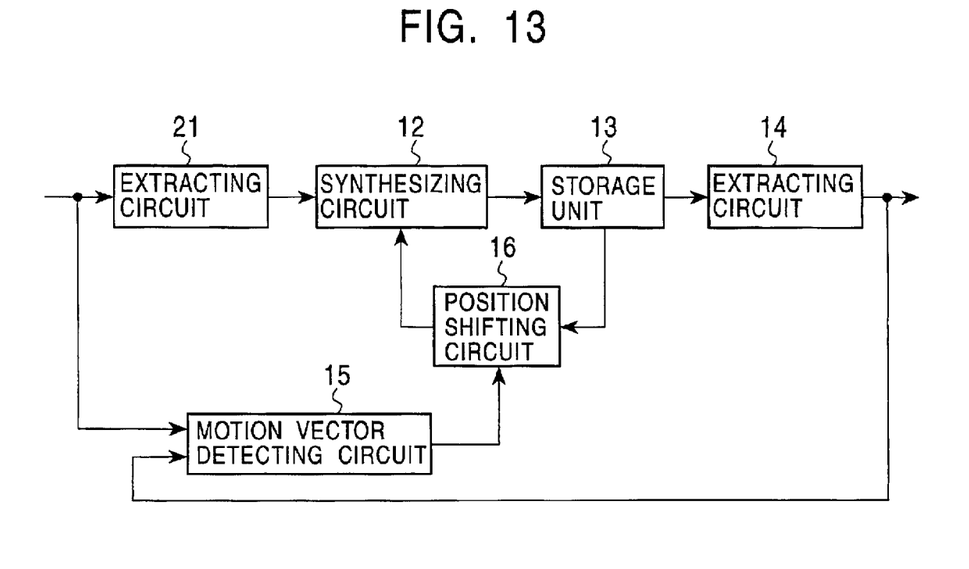
FIG. 13 is a block diagram of an image processing apparatus according to yet another embodiment of the present i invention.

In the image processing apparatus shown in FIG. 1, only the single extracting circuit 14 is provided subsequent to the storage unit 13; alternatively, another extracting circuit 21 may be provided instead of the delaying circuit 11. FIG. 13 is a block diagram of an image processing apparatus according to yet another embodiment of the present invention.

The extracting circuit 21 is constructed identically to the extracting circuit 14, and it extracts an image area determined as a telop from an input image, and supplies the extracted image area to the synthesizing circuit 12.

Figure 14:
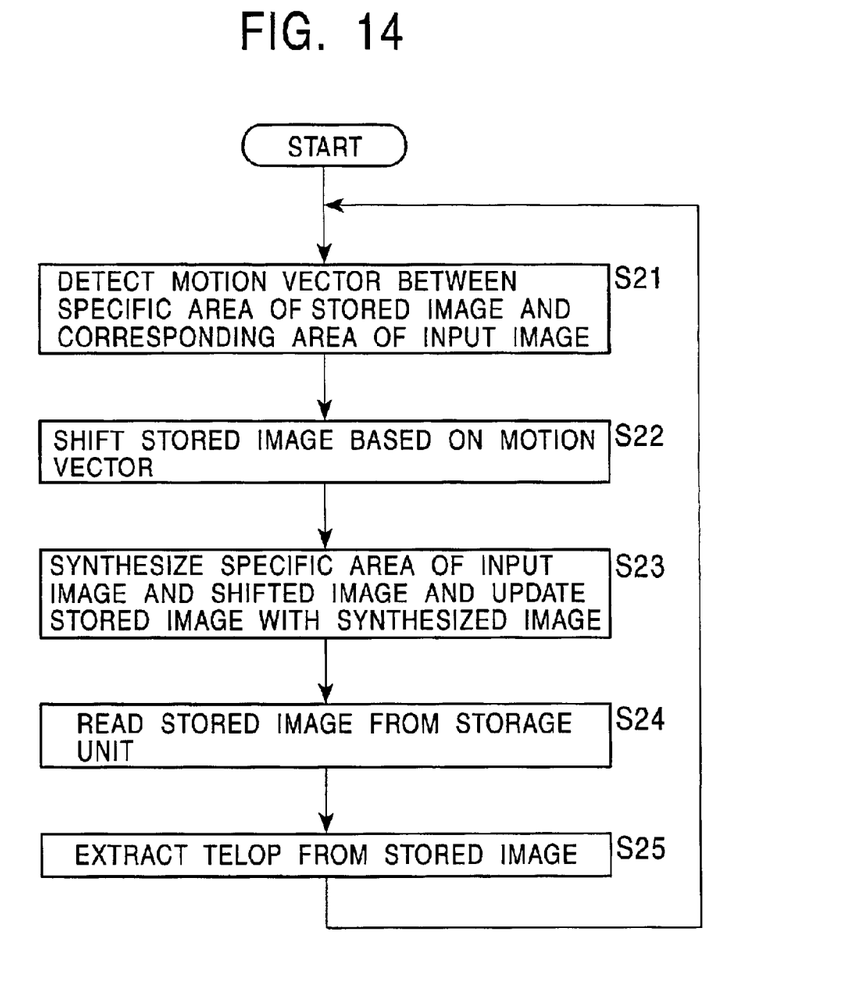
FIG. 14 is a flowchart showing the operation of the image processing apparatus shown in FIG. 13.

The operation of the image processing apparatus shown in FIG. 13 will be described with reference to the flowchart in FIG. 14.

In step S21, the same process as in step S1 shown in FIG. 3 is executed, and the description thereof will be omitted.

In step S22, the position shifting circuit 16 shifts the position of the stored image based on the motion vector supplied from the motion vector detecting circuit 15 so that the positions of the pixels in the image area of the stored image, determined as the telop and extracted by the extracting circuit 14, and the positions of the pixels in the image area of the input image, determined as the telop and extracted by the extracting circuit 21, will be in alignment, as shown in (A) of FIG. 4.

In step S23, the synthesizing circuit 12 synthesizes the image area of the input image, determined as the telop and extracted by the extracting circuit 21, and the stored image having been shifted by and supplied from the position shifting circuit 16, and supplies the synthesized image to the storage unit 13. The storage unit updates the stored image with the synthesized image supplied from the synthesizing circuit 12.

In steps S24 and S25, the same processes as in steps S4 and S5 shown in FIG. 3 are executed, and the descriptions thereof will be omitted.

Although the embodiments have been described above in relation to the examples in which a telop is extracted as a specific area, the present invention is not limited thereto, and an object which moves differently from the background area, for example, an image area of a moving automobile or a moving person, may be extracted as the specific area.

The series of processes described above may be implemented in software as well as in hardware. When the series of processes is implemented in software, a program of the software is installed and executed on a computer, whereby the functionality of any one of the image processing apparatuses described above is achieved.

Figure 15:
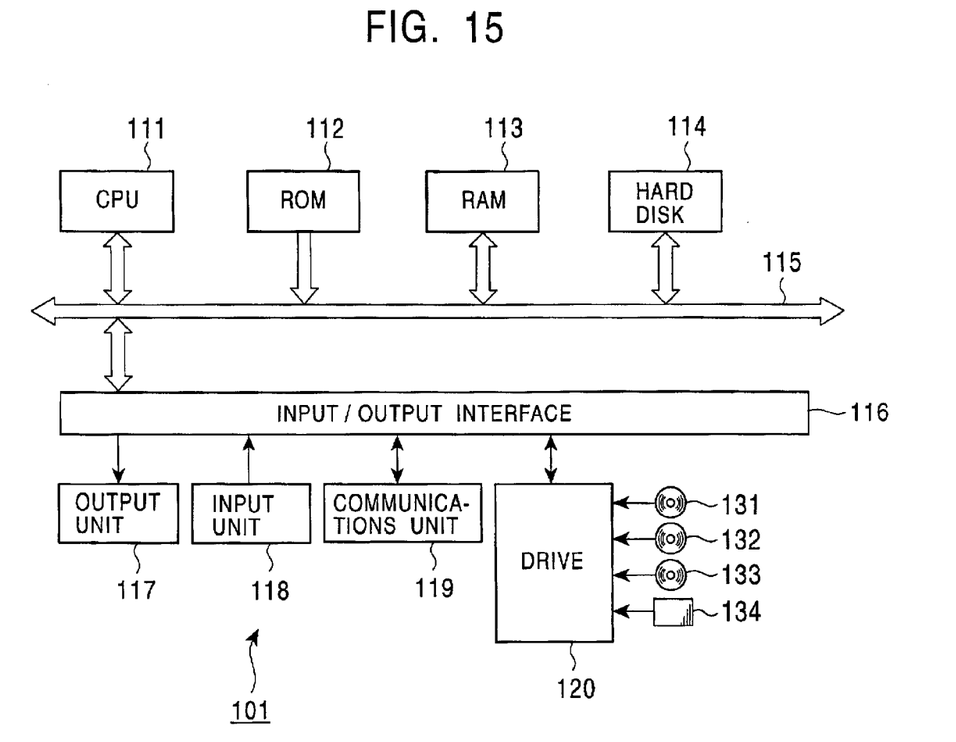
FIG. 15 is a block diagram of an example of a computer for implementing the present invention.

FIG. 15 is a block diagram of a computer 101 which functions as any one of the image processing apparatuses described above. Referring to FIG. 15, an input/output interface 116 is connected to a CPU (Central Processing Unit) 111 via a bus 115. When a command from the user is input from an input unit 118 including, for example, a keyboard, a mouse, etc., via the input/output interface 116 to the CPU 111, the CPU 111 loads a program stored in, for example, a ROM (Read-Only Memory) 112, a hard disk 114, or a storage medium mounted on a drive 120, such as a magnetic disk 131, an optical disk 132, a magneto-optical disk 133, and a semiconductor memory 134, whereby various processes, for example, the series of processes shown in the flowcharts of FIGS. 3, 12, and 14, are executed. Furthermore, the CPU 111 outputs, as required, the result of the processes to an output unit 117 including, for example, an LCD (Liquid Crystal Display) via the input/output interface 116. The program may be provided to the user integrally with the computer 101 by being prestored on the hard disk 114 or the ROM 112, as a package media such as the magnetic disk 131, the optical disk 132, the magneto-optical disk 133, and the semiconductor memory 134, or to the hard disk 114 via a communications unit 119 from a satellite, a network, etc.

In the program stored on the storage medium, the processing steps described hereinabove need not necessarily be executed sequentially in the described order, and may be executed in parallel or individually.

What is claimed is:

1. A digital image signal processing apparatus, to which an input digital image signal is input, said digital image processing apparatus comprising:

storing means for storing a digital image signal;

extracting means for extracting a signal representing a specific area from the digital image signal stored in said storing means;

detecting means for detecting a motion of the specific area based on the input digital image signal and the extracted signal representing a specific area; and synthesizing means for synthesizing the input digital image signal and the digital image signal stored in said storing means so as to align a position of the extracted specific area and a position of a corresponding area represented by the input digital image signal;

wherein said storing means updates the digital image signal stored therein with an output signal supplied from said synthesizing means.

2. A signal processing apparatus according to claim 1, wherein said synthesizing means comprises:

shifting means for shifting the position of the input image or the position of the specific area according to the motion detected by said detecting means; and adding means for adding the input image and the specific area.

3. A signal processing apparatus according to claim 2, wherein said adding means adds the input image and the specific area by a weighted addition.

4. A signal processing apparatus according to claim 1, wherein an object constituting said specific area moves differently from an object constituting the other area.

5. A signal processing apparatus according to claim 1, wherein said detecting means detects the motion on the basis of a unit having a pitch smaller than that of the pixels of the input image, the pixel density of the synthesized image being higher than the pixel density of the input image.

6. A signal processing apparatus according to claim 1, wherein said detecting means detects the motion on the basis of a unit having the same pitch as that of the pixels of the input image, the pixel density of the synthesized image being the same as the pixel density of the input image.

7. A signal processing apparatus according to claim 1, wherein said synthesizing means comprises:

shifting means for shifting the position of the specific area according to the motion detected by said detecting means; and adding means for adding the specific area having been shifted and the input image.

8. A signal processing apparatus according to claim 7, wherein said adding means adds the input image and the specific area by a weighted addition.

9. A signal processing apparatus according to claim 1, wherein said synthesizing means comprises:

shifting means for shifting the position of the input image according to the motion detected by said detecting means; and adding means for adding the input image having been shifted and the specific area.

10. A signal processing apparatus according to claim 9, wherein said adding means adds the input image and the specific area by a weighted addition.

11. A signal processing apparatus according to claim 1, further comprising second extracting means for extracting an area corresponding to the specific area from the input image.

12. A signal processing apparatus according to claim 1, wherein said extracting means extracts said signal representing the specific area on the basis of a luminance level and an edge sharpness of the specific area.

13. A signal processing apparatus according to claim 1, wherein said specific area is either a telop or an object which moves differently from the background area.

14. A signal processing apparatus according to claim 1, wherein said storing means updates the digital image signal by accumulating with said output signal supplied from said synthesizing means.

15. A signal processing apparatus according to claim 1, wherein said synthesizing means synthesizes the input digital image signal and the extracted signal representing the specific area.

* * * * *